United States Patent

[11] 3,567,961

[72] Inventor Walter Koechner
 Santa Monica, Calif.
[21] Appl. No. 749,075
[22] Filed July 31, 1968
[45] Patented Mar. 2, 1971
[73] Assignee The United States of America as represented by the Secretary of Army

[54] ANALOGUE TIME INTERVAL COUNTER
 3 Claims, 2 Drawing Figs.
[52] U.S. Cl. .................................................. 307/232,
 307/238, 307/265, 307/289, 307/295, 324/68,
 328/67, 328/129, 328/133
[51] Int. Cl. ............................................................ H03k 5/20
[50] Field of Search........................................ 307/233,
 232, 238, 246, 261, 265, 289, 293, 295; 328/55,
 58, 66, 67, 77, 121, 129, 133; 324/68 (A), 83 (A)

[56] References Cited
 UNITED STATES PATENTS
2,832,044 4/1958 Bliss.............................. 328/129X
2,877,412 3/1959 Most.............................. 324/68(A)
3,073,972 1/1963 Jenkins......................... 307/232
3,184,615 5/1965 Stover........................... 328/67X
3,469,112 9/1969 Hands et al. ................. 307/238

Primary Examiner—Stanley T. Krawczewicz
Attorneys—Harry M. Saragovitz, Edward J. Kelly, Herbert Berl and Jack H. Stanley ABSTRACT: A system for producing an analog voltage of the time interval between a start and stop pulse. The start pulse initiates circuitry for generating a charging voltage proportional to the time duration between a start and stop pulse, and the charging voltage is applied to a relatively slow response panel meter connected through a differential source follower amplifier consisting of two field effect transistors. The panel meter is connected across the respective source electrodes of the field effect transistors. If the time between two successive start pulses is smaller than the response time of the meter, pulse averaging takes place. If one assumes a response time of one second on the panel meter, then the displayed result represents the average value over $n$-range measurements where $n$ is the pulse repetition rate of the system.

INVENTOR,
WALTER KOECHNER.

ANALOGUE TIME INTERVAL COUNTER

BACKGROUND OF THE INVENTION

This invention relates to time interval counters and more particularly to analogue time interval counters readily adapted for use as range finders in a gallium arsenide optical radar system.

In ruby or neodymium laser range finding systems, digital time interval counters with digital read-out for range measurement must be utilized. This is so because lasers of this type allow only one firing every 10 second maximum. With such relatively low repetition rates, range accuracy in the digital counter is determined by the period of one cycle of the oscillator frequency. However, the development of gallium arsenide (GaAs) laser optical radar systems operating at high pulse repetition rates necessitated very short accurate time interval measurement. In such GaAs laser systems, the time interval counter must be able to operate at pulse repetition rates varying from 10 p.p.s. up to several hundred $MH_z$ and to accurately measure time intervals from 15 nanoseconds to several milliseconds. Considering the limited ranges, the counter should have at least one meter range resolution and this would require a relatively large and expensive digital counter.

SUMMARY OF THE INVENTION

It is therefore an object of the present invention to provide an analogue counter having a zero range capability and wherein pulse integration can readily be accomplished.

It is another object of the present invention to provide an analogue counter adapted to operate with a gallium arsenide optical radar system so that a better range capability may be obtained for such systems.

It is still another object of the present invention to provide an analogue counter which when operated in a gallium arsenide optical laser system greatly reduces the influence of false alarm triggerings and missing return pulses.

In brief, the present invention provides a system for increasing the duration between successively occurring start and stop pulses by producing the analogue voltage of the time interval therebetween. Included are means responsive to a start and stop pulse in that order for generating the voltage analogue of the time duration between a prescribed start pulse and its associated stop pulse and means including a differential source follower amplifier responsive to the voltage analogue for indicating the value thereof. The differential source follower amplifier consists of two field effect transistors, and a relatively slow acting panel meter is provided across the respective electrodes of the field effect transistors.

While the invention is best described below in connection with a gallium arsenide optical radar system, it is to be understood that the invention is not to be limited thereto.

BRIEF DESCRIPTION OF THE DRAWINGS

For a better understanding of the invention, together with other and further objects thereof, reference is made to the following description taken in connection with the accompanying drawing in which.

DESCRIPTION OF THE PREFERRED EMBODIMENT

Figure 1:
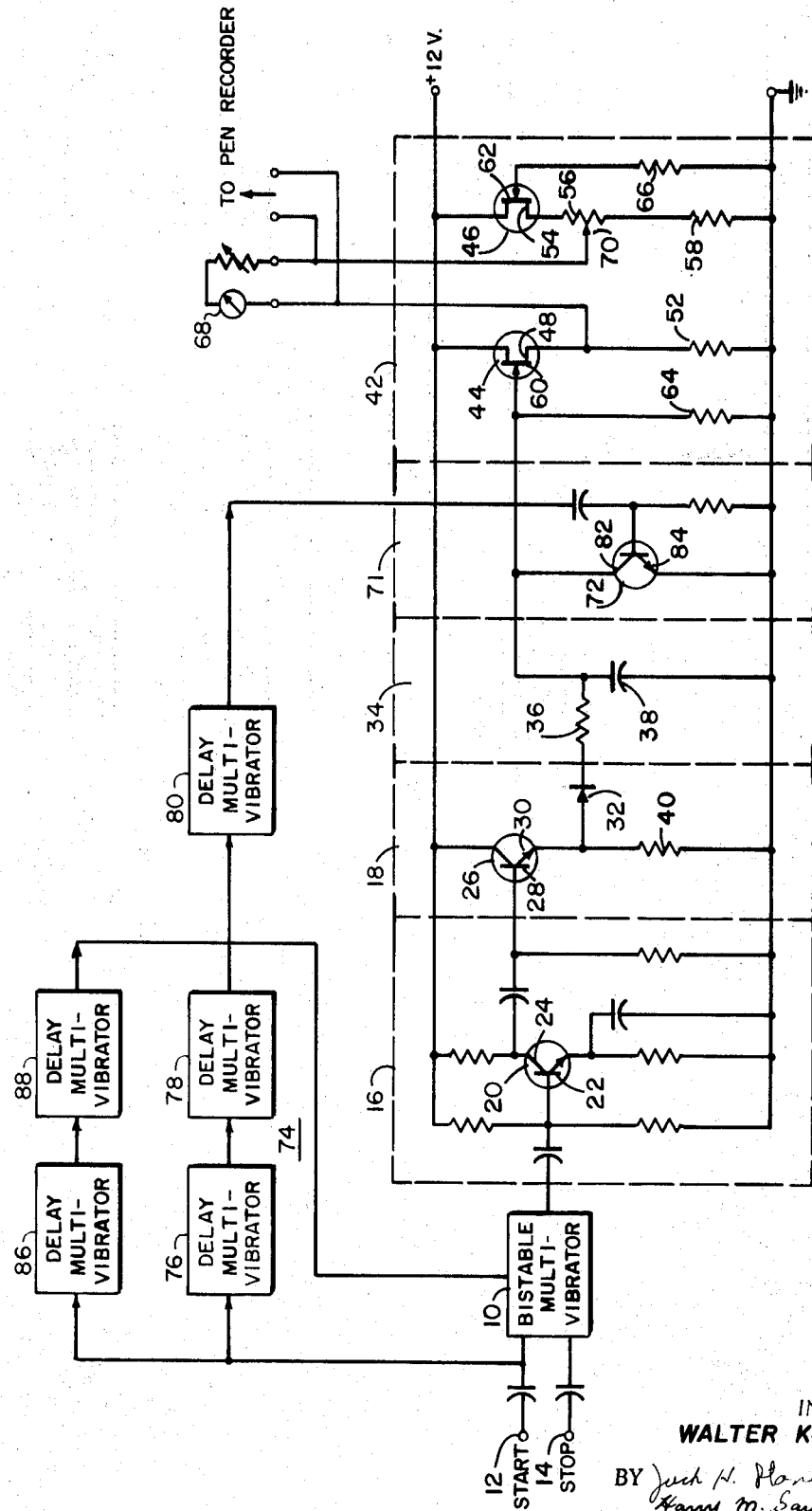
FIG. 1 is a schematic illustrating the present invention.

Referring now to FIG. 1 of the drawing, at 10 there is shown a bistable multivibrator having two input terminals 12 and 14 to which are applied digital start and stop signal pulses displaced in time by a duration $t_1$. Both start and stop signal pulses are of the same duration and positive polarity, the start pulse being obtained from the voltage developed across the injection laser diode and the stop pulse being the received amplified signal. The output of multivibrator 10 provides a relatively high level pulse having a duration corresponding to the time interval between the two applied pulses, with the output thereof returning to a relatively low level until again triggered by the start pulse to repeat the process. Assuming the time interval $t_1$ between the start and stop pulses, and a time interval $t_2$ between successive start pulses which are recurring at a predetermined PRF rate, then multivibrator 10 will provide a positive pulse having the duration $t_1$ and a negative pulse for the remainder of the duration $t_2$. The cyclic output of bistable multivibrator 10 is amplified in transistor amplifier stage 16 to increase the swing between the two levels of bistable multivibrator 10 from 0.8 volts to about 10 volts, and the amplified output of stage 16 is coupled to emitter follower stage 18 which provides a positive output pulse of duration $t_1$ at approximately 10 volts. Transistor amplifier stage 16 includes the transistor 20 which is normally operated at saturation, with the input thereto being RC coupled from bistable multivibrator 10 to the base 22 of transistor 20, and the amplified output therefrom being derived from the collector 24 of transistor 20. The emitter follower includes transistor 26 which is normally operated at cutoff, with the input thereto being RC coupled to base 28 and the output therefrom being derived from emitter 30 which is connected to ground through load resistor 40.

The positive rectangular output pulse from emitter follower 18 is applied through normally reversed bias diode 32 to integrating or RC charging circuit 34 which includes resistor 36 and capacitor 38, with the capacitor 38 being connected to ground as shown. Provided that the time constant $R_{36}C_{38}$ is much smaller than $t_1$, the voltage across capacitor 38 increases linearly for the duration of the positive output pulse derived from emitter follower 18, i.e. for the duration $t_1$. At the termination of the output pulse from emitter follower 18, diode 32 again reverts to its normally reversed bias state to prevent capacitor 38 from discharging through emitter follower resistor 40. As shown, the voltage across capacitor 38 is applied to a differential source follower amplifier 42 consisting of two field effect or unipolar transistors 44 and 46. The source electrode 48 of field effect transistor 44 is connected to ground through resistor 52 and source electrode 54 of field effect transistor 46 is connected to ground through series connected potentiometer 56 and resistor 58. The respective gate electrodes 60 and 62 of the field effect transistors are connected to ground through respective load resistors 64 and 66. A panel meter 68, or other suitable indicator, is connnected across source electrode 48 and center arm 70 of potentiometer 56. The potentiometer 56 provides a zeroing control for the meter 68. As shown, the voltage developed across charging capacitor 38 is applied to the gate electrode 60 of field effect transistor 44. Field effect transistors 44 and 46 provide a high input impedance to prevent any appreciable decrease of the voltage stored in capacitor 38. The reading on panel meter 68 provides the range measurement desired.

Before the next sequence of start and stop pulse arrives, capacitor 38 is discharged by means of a discharge circuit 71 consisting of a switching transistor 72 which is connected across capacitor 38 and triggered into conduction by the output of a suitable delay circuit 74 shortly before the next sequence of start and stop pulse is due to arrive, preferably 100 microseconds prior to the arrival of the next successive start pulse. Any suitable well known delay circuit may be utilized. One such circuit may include three series connected monostable multivibrator circuits 76, 78 and 80, the first of which, 76, is triggered by the arrival of a start pulse from terminal 12 and the third of which, 80, provides a relatively narrow positive rectangular pulse prior to the arrival of a second start pulse. Switching transistor 72 has its collector 82 and emitter 84 connected across charging capacitor 38 and the base electrode thereof is RC coupled to the output of the delay circuit 74 and responsive thereto. Switching transistor 72 is normally biased to cutoff and is only turned on during the duration of the positive pulse derived from delay circuit 74 prior to the arrival of a successive sequential start pulse. With switching transistor 72 rendered conductive integrating capacitor 38 is discharged to ground through the switching transistor 72 with a time constant given by capacitor 38 and the inherent resistance of switching transistor 72.

In order to reset bistable multivibrator 10 in case there is a received stop signal pulse missing, two series connected monostable multivibrators 86 and 88 are arranged to be triggered by the start pulse from terminal 12 and generate a delayed 100 nanosecond pulse with the amount of delay corresponding to the maximum range desired. In case bistable multivibrator 10 is already reset by a received signal, the delayed pulse generated by monostable multivibrator 88 does not have any effect on bistable multivibrator 10. If no signal or stop pulse has been received, then stable multivibrator 10 is reset by the delayed output pulse from monostable multivibrator 88.

Figure 2:
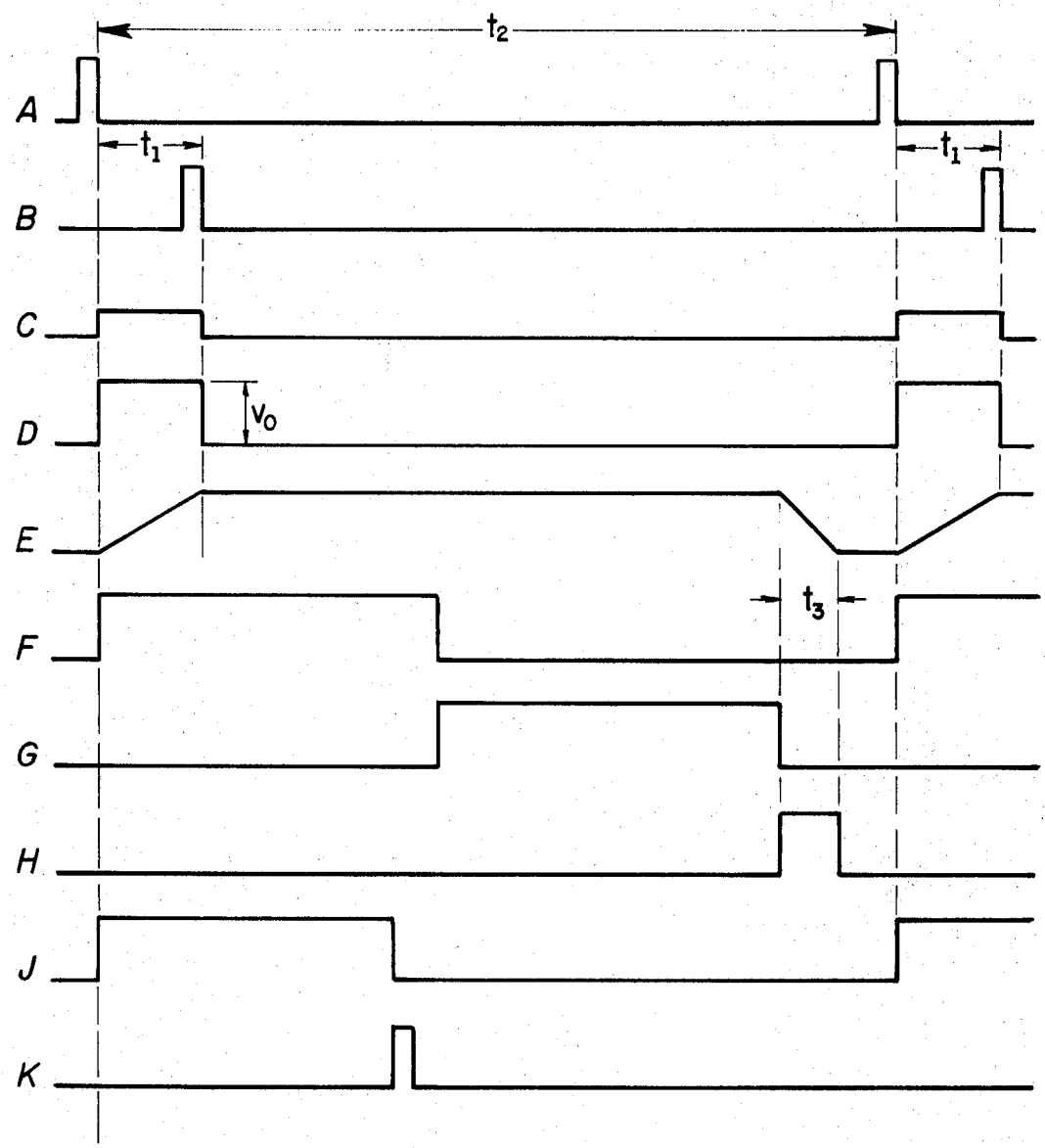
FIG. 2 illustrates the waveforms at various stages in FIG. 1 to better understand the operation of the invention.

FIG. 2 is now referred to to illustrate the operation of the analogue time interval counter. FIG. 2A shows the cyclic start pulse generated at a prescribed PRF rate with a duration $t_2$ therebetween. FIG. 2B illustrates the detected stop pulses which correspond to the detected received signal pulses. As shown, the time duration between the start and stop pulse is indicated as $t_1$. FIG. 2C shows the output of bistable multivibrator 10 which is first triggered by the start pulse to initiate a relatively positive pulse having a duration $t_1$ and then triggered by the stop pulse to provide a relatively negative pulse for the remainder of the duration $t_2$. FIG. 2D illustrates the amplified bistable multivibrator 10 output derived from emitter follower 18. The voltage developed across integrating or charging network 34 is shown at FIG. 2E. FIGS. 2F through 2H illustrate the output of delay multivibrators 76—80 with FIG. 2H illustrating the positive pulse required to turn switching transistor 72 on and thus provide a discharge path for capacitor 38 of integrating circuit 34. FIGS. 2J and 2K illustrate the respective outputs from monostable vibrators 86 and 88.

Inasmuch as the output of the differential amplifier is connected to panel meter 68, if the time $t_2$, that is the time between two successive start pulses is smaller than the response time of the meter, pulse averaging takes place. If one assumes a response time of one second for panel meter 68, then the displayed result represents the average value over n-range measurements, (with n being the pulse repetition rate of the system). The accuracy of the range measurement depends primarily on the linearity between pulse length $t_1$ and the voltage developed across charging capacitor 38. With the circuit shown in FIG. 1, the linearity error can be shown to be less than 1 percent.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

I claim:

1. A system for measuring the duration between successively occurring start and stop pulses comprising:

a voltage analogue-generating means including a bistable multivibrator responsive to said start and stop pulses for producing a relatively positive pulse for the duration between said prescribed start pulse and its associated stop pulse, and a relatively negative pulse for the duration between said associated stop pulse and the next successive start pulse, means for amplifying said positive pulse, and a RC integrating circuit responsive to said amplified positive pulse;

a differential source-follower amplifier responsive to said voltage analogue comprising two field-effect transistors and a relatively slow acting panel meter connected across the respective source electrodes of said field-effect transistors; and means connected across said RC integrating circuit and responsive to the start pulses for discharging said RC integrating circuit just prior to the occurrence of the next successive occurring start pulse.

2. The system in accordance with claim 1 and further including an emitter follower interconnecting said RC integrating circuit and said positive pulse amplifying means.

3. The system in accordance with claim 1 wherein said discharging means comprises three series connected delay multivibrators responsive to the start pulses and a switching transistor responsive to the output of the third of said delay multivibrators and connected across the capacitor of said RC integrating circuit.